United States Patent
Itoh et al.

(10) Patent No.: US 11,290,921 B2
(45) Date of Patent: Mar. 29, 2022

(54) MANAGEMENT SERVER, WIRELESS ACCESS NODE, COMMUNICATION SYSTEM, COMMUNICATION METHOD, RESOURCE MANAGEMENT METHOD, AND COMPUTER READABLE MEDIUM

(71) Applicant: NEC CORPORATION, Tokyo (JP)

(72) Inventors: Nobuhiko Itoh, Tokyo (JP); Motoki Morita, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,609

(22) PCT Filed: Dec. 17, 2018

(86) PCT No.: PCT/JP2018/046306
§ 371 (c)(1),
(2) Date: Sep. 25, 2020

(87) PCT Pub. No.: WO2019/187389
PCT Pub. Date: Oct. 3, 2019

(65) Prior Publication Data
US 2021/0029589 A1 Jan. 28, 2021

(30) Foreign Application Priority Data
Mar. 28, 2018 (JP) .............................. JP2018-063231

(51) Int. Cl.
*H04W 28/24* (2009.01)
*H04W 72/08* (2009.01)

(52) U.S. Cl.
CPC ......... *H04W 28/24* (2013.01); *H04W 72/087* (2013.01)

(58) Field of Classification Search
CPC ............................ H04W 28/24; H04W 72/087
See application file for complete search history.

(56) References Cited

U.S. PATENT DOCUMENTS 7,289,820 B2 * 10/2007 Shiota ................... H04W 56/00
455/13.1
9,072,097 B2 * 6/2015 Yoshimoto .......... H04W 72/085
(Continued)

FOREIGN PATENT DOCUMENTS

| JP | 2017-17655 A | 1/2017 |
| WO | 2008/087724 A1 | 7/2008 |
| WO | 2017/169061 A1 | 10/2017 |

OTHER PUBLICATIONS

Motoki Morta et al., "Deadline-aware scheduling scheme for realizing connected car in mobile networks", IEICE Technical Report, Mar. 1, 2018, 8 pgs., vol. 117, No. 486.
(Continued)

*Primary Examiner* — Harry H Kim
(74) *Attorney, Agent, or Firm* — Sughrue Mion, PLLC

(57) ABSTRACT

To provide a management server capable of changing conditions corresponding to delay requirements according to a change in wireless communication environment, a management server (10) according to the disclosure includes an update unit (11) configured to update any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow, and a communication unit (12) configured to send the updated uplink allowable delay or the updated downlink allowable delay to a wireless access node that performs resource scheduling by using an uplink allowable delay or a downlink allowable delay.

9 Claims, 7 Drawing Sheets

(56) References Cited

U.S. PATENT DOCUMENTS

| | | |
|---|---|---|
| 10,028,289 B2* | 7/2018 | Zhou .................. H04L 65/80 |
| 2011/0075579 A1 | 3/2011 | Seymour et al. |
| 2012/0099454 A1* | 4/2012 | Jung ............... H04W 72/1247 |
| | | 370/252 |
| 2016/0105899 A1* | 4/2016 | Zhou ................ H04W 72/085 |
| | | 370/329 |

OTHER PUBLICATIONS

International Search Report for PCT/JP2018/046306 dated Feb. 19, 2019 (PCT/ISA/210).
Japanese Office Action for JP Application No. 2020-509638 dated Nov. 9, 2021 with English Translation.

* cited by examiner

MANAGEMENT SERVER, WIRELESS ACCESS NODE, COMMUNICATION SYSTEM, COMMUNICATION METHOD, RESOURCE MANAGEMENT METHOD, AND COMPUTER READABLE MEDIUM

CROSS REFERENCE TO RELATED APPLICATIONS

This application is a National Stage of International Application No. PCT/JP2018/046306 filed Dec. 17, 2018, claiming priority based on Japanese Patent Application No. 2018-063231 filed Mar. 28, 2018, the disclosures of which are incorporated herein in their entirety by reference

TECHNICAL FIELD

The present invention relates to a management server, a wireless access node, and a communication system.

BACKGROUND ART

Providing an ultra-low latency service though a mobile network is currently under consideration. The ultra-low latency service may be a self-operating service that transmits in-vehicle sensor information, traffic camera information, map information and so on through a mobile network, for example.

A mobile carrier (mobile telecommunications carrier) needs to guarantee SLA (Service Level Agreement) in order to provide a user with an ultra-low latency service. The SLA may define a delay time or the like guaranteed in the ultra-low latency service, for example.

Patent Literature 1 discloses that delay requirements for a communication terminal are determined according to the characteristics of the communication terminal. A base station located in a wireless access network performs radio resource management so as to satisfy the delay requirements defined for each communication terminal. For example, radio resources are preferentially allocated a communication terminal with strict delay requirements.

CITATION LIST

Patent Literature

PTL1: Japanese Unexamined Patent Application Publication No. 2017-017655

SUMMARY OF INVENTION

Technical Problem

The delay requirements related to each communication terminal disclosed in Patent Literature 1 are determined according to a terminal type, which is predetermined information such as whether a communication terminal is a car navigation system or a smart meter, as the characteristics of the communication terminal. Therefore, the delay requirements are statically determined for a communication terminal. On the other hand, the wireless communication environment varies with time. Thus, the delay requirements associated with a communication terminal do not change regardless of the degradation of the wireless communication environment. Therefore, even when the wireless communication environment is degraded, radio resources are allocated to communication terminals according to the same priority as before the wireless communication environment is degraded. This causes a problem that, when the wireless communication environment is degraded, the delay time of a flow transmitted between communication terminals increases, failing to satisfy the delay requirements.

An object of the present disclosure is to provide a management server, a wireless access node, and a communication system capable of changing conditions corresponding to delay requirements according to a change in wireless communication environment.

Solution to Problem

A management server according to a first aspect of the present disclosure includes an update unit configured to update any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow, and a communication unit configured to send the updated uplink allowable delay or the updated downlink allowable delay to a wireless access node configured to perform resource scheduling by using an uplink allowable delay or a downlink allowable delay.

A wireless access node according to a second aspect of the present disclosure includes a communication unit configured to acquire any one of an uplink allowable delay associated with an uplink flow sent from a source communication terminal to an application server and a downlink allowable delay associated with a downlink flow sent from the application server to a destination communication terminal updated by using a delay of an end-to-end flow sent from the source communication terminal to the destination communication terminal through the application server and an allowable delay associated with the end-to-end flow, and a control unit configured to perform resource scheduling related to any one of the source communication terminal and the destination communication terminal by using any one of the acquired uplink allowable delay and the acquired downlink allowable delay.

A communication system according to a third aspect of the present disclosure includes a management server configured to update any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow, and send the updated uplink allowable delay or the updated downlink allowable delay, and a wireless access node configured to perform resource scheduling by using the updated uplink allowable delay or the updated downlink allowable delay.

A communication method according to a fourth aspect of the present disclosure includes updating any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow, and sending the updated uplink allowable delay or the updated downlink allowable delay to a wireless access node configured to perform resource scheduling by using an uplink allowable delay or a downlink allowable delay.

A resource management method according to a fifth aspect of the present disclosure includes acquiring any one of an uplink allowable delay associated with an uplink flow sent from a source communication terminal to an application server and a downlink allowable delay associated with a downlink flow sent from the application server to a destination communication terminal updated by using a delay of an end-to-end flow sent from the source communication terminal to the destination communication terminal through the application server and an allowable delay associated with the end-to-end flow, and performing resource scheduling related to any one of the source communication terminal and the destination communication terminal by using any one of the acquired uplink allowable delay and the acquired downlink allowable delay.

A program according to a sixth aspect of the present disclosure causes a computer to perform updating any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow, and sending the updated uplink allowable delay or the updated downlink allowable delay to a wireless access node configured to perform resource scheduling by using an uplink allowable delay or a downlink allowable delay.

Advantageous Effects of Invention

According to the present disclosure, there are provided a management server, a wireless access node, and a communication system capable of changing conditions corresponding to delay requirements according to a change in wireless communication environment.

DESCRIPTION OF EMBODIMENTS

First Example Embodiment

Figure 1:
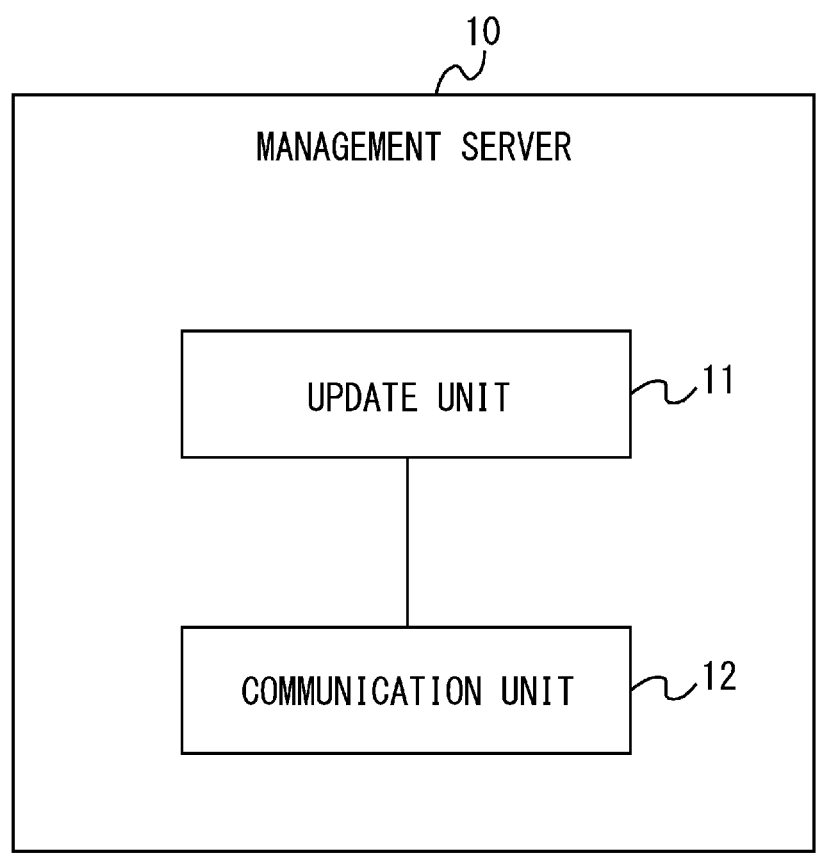
FIG. 1 is a block diagram of a management server according to a first example embodiment.

Example embodiments of the present invention are described hereinafter with reference to the drawings. A configuration example of a management server 10 according to a first example embodiment is described hereinafter with reference to FIG. 1. The management server 10 may be a computer device that operates when a processor executes a program stored in a memory.

The management server 10 includes an update unit 11 and a communication unit 12. The update unit 11 and the communication unit 12 may be software or module whose processing is performed when a processor executes a program stored in a memory. The update unit and the communication unit may be referred to as an update module and a communication module, respectively. Further, the update unit 11 and the communication unit 12 may be hardware such as a chip or a circuit.

The update unit 11 updates an uplink allowable delay associated with an uplink flow to be sent from a source communication terminal to an application server. The update unit 11 also updates a downlink allowable delay associated with a downlink flow to be sent from the application server to a destination communication terminal. When updating the uplink allowable delay or the downlink allowable delay, the update unit 11 uses a delay of an end-to-end flow that is sent from the source communication terminal to the destination communication terminal and an allowable delay associated with the end-to-end flow. The end-to-end flow is sent from the source communication terminal to the destination communication terminal through the application server.

The communication terminal may be a computer device having a communication function such as a cellular phone terminal or a smart phone terminal. Further, the communication terminal may be an IoT terminal, an MTC (Machine Type Communication) terminal or the like. The uplink flow, the downlink flow and the end-to-end flow (which are referred to hereinafter as a flow) contains one or a plurality of data transmitted in an application service provided to a communication terminal, for example. The data contained in the flow may be referred to as a data packet. Further, the data contained in the flow may be referred to as a chunk composed of one or more data packets.

The data (e.g., application data) transmitted in an application service may be image data, video data or the like, for example. The application data may contain a request message that requests transmission of image data or the like, a response message that responds to a request message, and so on.

The allowable delay may be referred to as a deadline or a transmission deadline. The allowable delay indicates a time limit by which transmission of a plurality of data packets contained in one flow should be completed. The allowable delay is requested by an application. The allowable delay may be referred to also as a transmission time limit. Further, the allowable delay may be referred to also as the maximum transmission delay that is allowed in an application. The allowable delay can be defined in various ways. For example, the allowable delay may indicate a completion time limit of transmission by a sender of an application layer. Alternatively, the allowable delay may indicate a completion time limit of transmission by a sender of a radio layer. The allowable delay may indicate a completion time limit of reception by a receiver of an application layer. The allowable delay may indicate a completion time limit of reception by a receiver of a radio layer. The allowable delay may indicate a time limit by which a receiver of an application layer completes receiving the last data packet related to one flow after starting sending the first data packet related to this one flow. The allowable delay may indicate a time limit by which a receiver of a radio layer completes receiving the last data packet related to one flow after starting sending the first data packet related to this one flow.

The uplink allowable delay may indicate a time limit by which the application server receives data related to a flow after the source communication terminal sends data related to this flow. The downlink allowable delay may indicate a time limit by which the destination communication terminal receives data related to a flow after the application server sends data related to this flow.

The update unit 11 may update the uplink allowable delay or the downlink allowable delay according to a change in the delay of the end-to-end flow sent from the source communication terminal to the destination communication terminal. The allowable delay associated with the end-to-end flow is a static value that is requested by an application. On the other hand, the uplink allowable delay or the downlink allowable delay is a dynamic value that is updated according to a change in the delay of the end-to-end flow. Further, the delay of the end-to-end flow is a time taken for a flow sent from the source communication terminal to be actually received by the destination communication terminal.

The communication unit 12 sends the uplink allowable delay or the downlink allowable delay updated in the update unit 11 to a wireless access node. The wireless access node is a node located in a wireless access network. The wireless access node may be a base station, for example. The wireless access node performs resource scheduling by using the uplink allowable delay or the downlink allowable delay. The resource scheduling is to allocate, by the wireless access node, radio resources to be used when a communication terminal sends or receives data to the source communication terminal or the destination communication terminal.

The wireless access node may preferentially allocate radio resources to a communication terminal that performs communication related to a flow where the value of the uplink allowable delay or the downlink allowable delay is small, for example. Alternatively, the wireless access node may preferentially allocate radio resources to a communication terminal that performs communication related to a flow where the time remaining until the end of the uplink allowable delay or the downlink allowable delay is short.

As described above, the management server 10 manages at least one of the uplink allowable delay and the downlink allowable delay as a dynamically updatable allowable delay. The management server 10 can update at least one of the uplink allowable delay and the downlink allowable delay according to a delay in the end-to-end flow. This allows to change the uplink allowable delay or the downlink allowable delay to be used for resource scheduling when the wireless communication environment has changed and thereby a delay in the end-to-end flow has changed.

Second Example Embodiment

Figure 2:
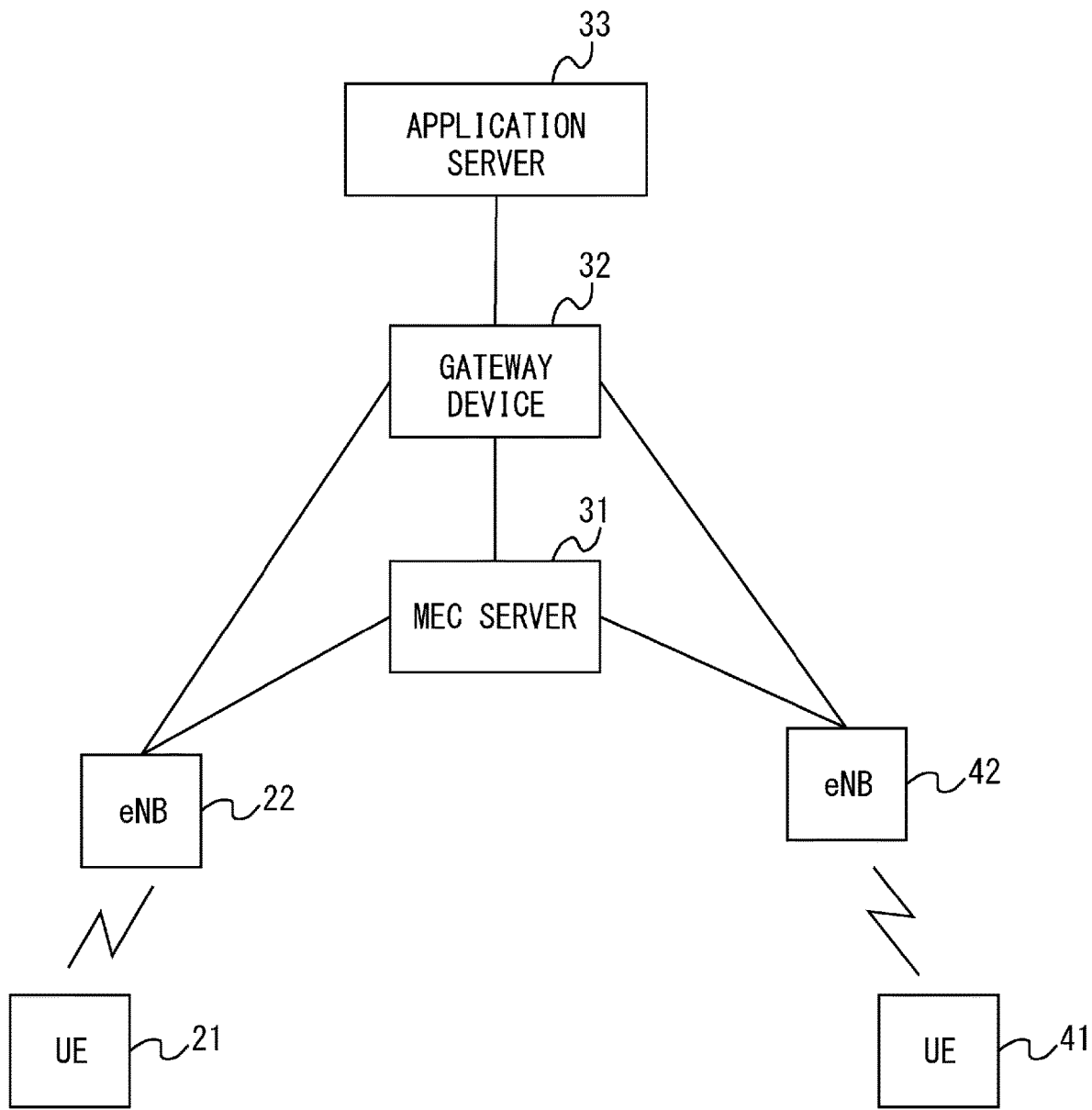
FIG. 2 is a block diagram of a communication system according to a second example embodiment.

A configuration example of a communication system according to a second example embodiment is described hereinafter with reference to FIG. 2. The communication system in FIG. 2 includes a UE (User Equipment) 21, an eNB (evolved Node B) 22, a UE 41, an eNB 42, an MEC (Mobile Edge Computing) server 31, a gateway device 32, and an application server 33. The UE is a general term for communication terminals in 3GPP (3rd Generation Partnership Project). The eNB is a base station that supports LTE (Long Term Evolution) which is defined as a wireless communication system in 3GPP. In the description of FIG. 2, it is assumed that the UE 21 is the source communication terminal, and the UE 41 is the destination communication terminal.

The eNB 22 performs resource scheduling related to the UE 21. The resource scheduling may be referred to as resource management, for example. The eNB 42 performs resource scheduling related to the UE 41. A flow sent from the UE 21 is sent to the UE 41 through the application server 33. At this time, the flow sent from the UE 21 may be sent to the application server 33 through the eNB 22 and the gateway device 32. Alternatively, the flow sent from the UE 21 may be sent to the application server 33 through the eNB 22, the MEC server 31, and the gateway device 32.

Further, a flow sent from the application server 33 may be sent to the UE 41 through the gateway device 32 and the eNB 42. Alternatively, the flow sent from the application server 33 may be sent to the UE 41 through the gateway device 32, the MEC server 31 and the eNB 42.

The MEC server 31 is the equivalent of the management server 10 in FIG. 1. The MEC server 31 is a server that is located in a position close to a UE, and it is located in close proximity to the eNB 22 or the eNB 42 in FIG. 2. The MEC server 31 may be used as an application server. In this case, a flow between the UE 21 and the UE 41 is sent to the UE 41 through the eNB 22, the MEC server 31 and the eNB 42. Providing an application service by the MEC server 31 located in close proximity to the UE allows reducing the delay between the UE 21 and the UE 41.

Further, although only one MEC server 31 is located in the example of FIG. 2, one MEC server may be located in close proximity to the eNB 22, and another MEC server may be located in close proximity to the eNB 42. In this case, the flow between the UE 21 and the UE 41 may go through the two MEC servers or may go through only one MEC server that provides an application service related to this flow.

The gateway device 32 relays the flow transmitted among the eNB 22, the application server 33 and the eNB 42. It also relays the flow transmitted between the MEC server 31 and the application server 33. The gateway device 32 may be an SGW (Serving Gateway), a PGW (Packet Data Network Gateway) or the like defined in 3GPP, for example. Although only one gateway device 32 is located in the example of FIG. 2, two or more gateway devices may be located, for example. The application server 33 is a server that provides the UE 21 or the UE 41 with an application service.

The communication path between the UE 21 and the application server 33 is referred to as an uplink path segment. The communication path between the application server 33 and the UE 41 is referred to as a downlink path segment. Further, in the case where the MEC server 31 is used as an application server, the communication path between the UE 21 and the MEC server 31 is referred to as an uplink path segment. Further, in the case where the MEC server 31 is used as an application server, the communication path between the MEC server 31 and the UE 41 is referred to as a downlink path segment.

Figure 3:
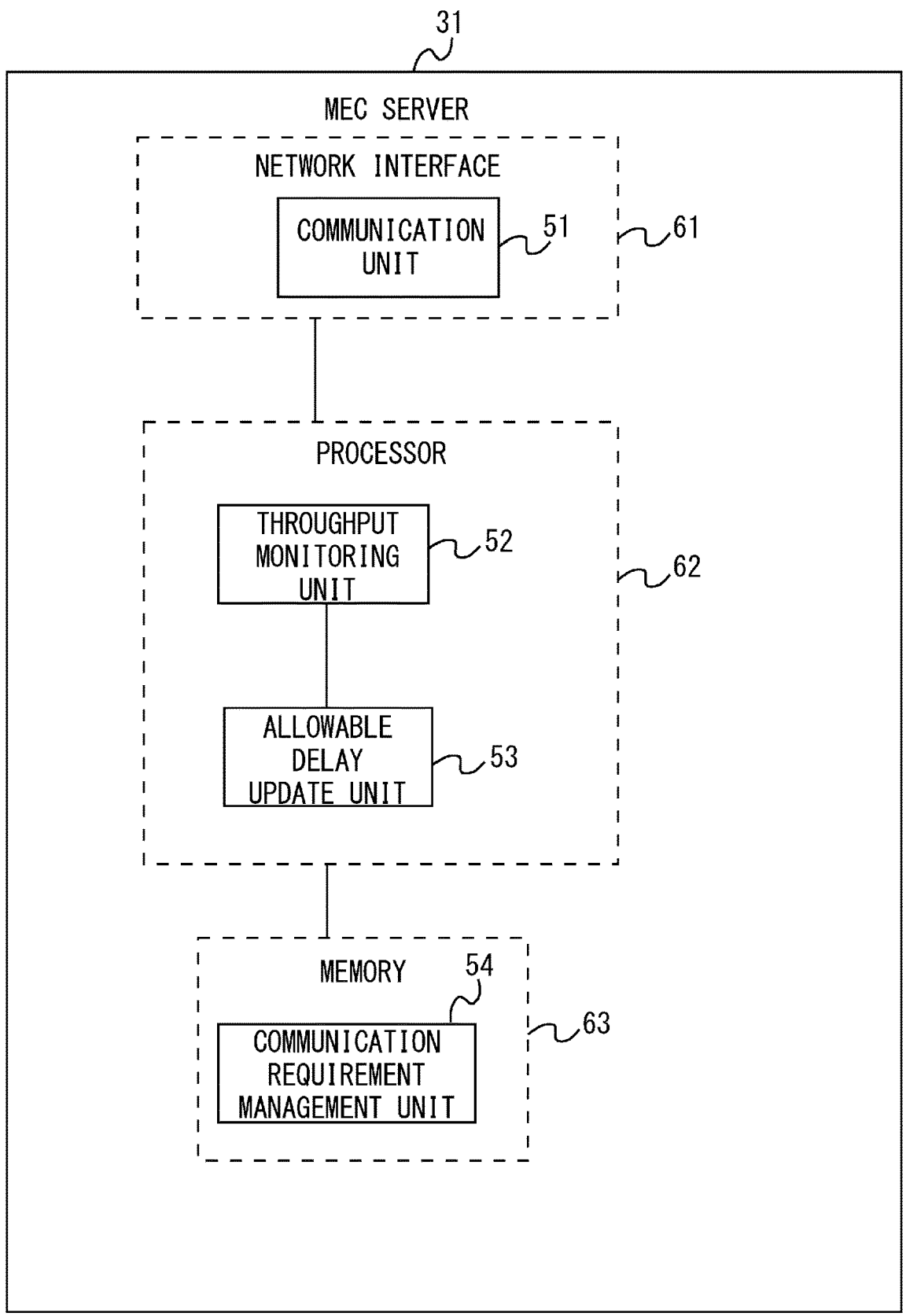
FIG. 3 is a block diagram of an MEC server according to the second example embodiment.

A configuration example of the MEC server 31 according to the second example embodiment is described hereinafter with reference to FIG. 3. The MEC server 31 includes a network interface 61, a processor 62, and a memory 63.

The network interface 61 is used to communicate with another communication network device. The network interface 61 may include a network interface card (NIC) compliant with IEEE 802.3 series. The network interface 61 includes a communication unit 51, which is the equivalent of the communication unit 12 in FIG. 1.

The processor 62 reads software (computer program) from the memory 63 and performs processing which is described hereinafter with reference to flowcharts and the like. The processor 62 may be a microprocessor, an MPU (Micro Processing Unit) or a CPU (Central Processing Unit), for example. The processor 62 may include a plurality of processors.

The memory 63 is a combination of a volatile memory and a nonvolatile memory. The memory 63 may include a storage that is placed apart from the processor 62. In this case, the processor 62 may access the memory 63 through an I/O interface, which is not shown. The memory 63 is used to store software or a group of software modules. The processor 62 reads and runs the software or the group of software modules from the memory 63.

The processor 62 is used to perform the functions or processing in a throughput monitoring unit 52 and an allowable delay update unit 53. Further, the memory 63 includes a communication requirement management unit 54. The communication requirement management unit 54 manages the allowable delay in the end-to-end flow and information about the flow size of the end-to-end flow. The communication requirement management unit 54 may manage the flow size of each path segment that constitutes the end-to-end flow. To manage is, in another term, to retain or store.

The throughput monitoring unit 52 monitors the uplink throughput in the uplink path segment and the downlink throughput in the downlink path segment. In other words, the throughput monitoring unit 52 acquires the uplink throughput and the downlink throughput. For example, the throughput monitoring unit 52 may acquire the uplink throughput and the downlink throughput from the application server 33. Alternatively, the throughput monitoring unit 52 may acquire the uplink throughput from the eNB 22 and acquire the downlink throughput from the eNB 42.

When acquiring the throughput from the eNB 22 and the eNB 42, the throughput monitoring unit 52 acquires the throughput in a wireless section between the UE and the eNB. Variation in the communication environment occurs mainly in the wireless section. Sated differently, variation in the communication environment rarely occurs in a core network section. Thus, variation in delay in the end-to-end flow between the UE 21 and the UE 41 is caused mainly by variation in the communication environment in the wireless section. Therefore, the throughput monitoring unit 52 may acquire the throughput in the wireless section between the UE 21 and the eNB 22 as an uplink throughput. Further, the throughput monitoring unit 52 may acquire the throughput in the wireless section between the UE 41 and the eNB 42 as a downlink throughput.

Alternatively, when the end-to-end flow between the UE 21 and the UE 41 goes through the MEC server 31, the MEC server 31 may measure the uplink throughput and the downlink throughput.

The allowable delay update unit 53 updates the uplink allowable delay or the downlink allowable delay by using the uplink throughput, the downlink throughput, and information managed in the allowable delay update unit 53.

The update of the uplink allowable delay or the downlink allowable delay performed by the allowable delay update unit 53 is described in detail. Hereinafter, the update of the uplink allowable delay is described in detail.

The allowable delay update unit 53 calculates the updated uplink allowable delay according to the following Equation 1.

$$\text{New\_UL\_Deadline} = \text{Current\_UL\_Deadline} + (\text{Target\_UL\_Delay} - \text{UL\_Delay}) \times K \quad \text{(Equation 1)}$$

New_UL_Deadline: Updated uplink allowable delay
Current_UL_Deadline: Currently set uplink allowable delay
Target_UL_Delay: Target delay in the uplink path segment
UL_Delay: Delay occurring in the uplink path segment
K: Coefficient (constant)
Target_UL_Delay is calculated as
Target_UL_Delay=E2E_Deadline−DL_Delay.
E2E_Deadline is the allowable delay associated with the end-to-end flow. DL_Delay is the delay occurring in the downlink path segment. Thus, Target_UL_Delay is set as a value where the sum of the target delay in the uplink path segment and the delay occurring in the downlink path segment does not exceed the allowable delay associated with the end-to-end flow.

Substituting Target_UL_Delay=E2E_Deadline-DL_Delay into Equation 1 yields the following Equation 2.

$$\text{New\_UL\_Deadline} = \text{Current\_UL\_Deadline} + \{E2E\_\text{Deadline} - (\text{DL\_Delay} + \text{UL\_Delay})\} \times K \quad \text{(Equation 2)}$$

E2E_Deadline−(DL_Delay+UL_Delay) indicates subtracting the delay occurring between the UE 21 and the UE 41 from the allowable delay associated with the end-to-end flow.

Equation 2 indicates using the allowable delay associated with the end-to-end flow and the delay occurring between the UE 21 and the UE 41 when updating the uplink allowable delay.

Further, in Equation 2, when DL_Delay+UL_Delay is greater than E2E_Deadline, that is, when the end-to-end flow does not satisfy the allowable delay, E2E_Deadline−(DL_Delay+UL_Delay) has a negative value. Thus, in this case, New_UL_Deadline is smaller than Current_UL_Deadline. On the other hand, when DL_Delay+UL_Delay is smaller than E2E_Deadline, that is, when the end-to-end flow satisfies the allowable delay, E2E_Deadline−(DL_Delay+UL_Delay) has a positive value. Thus, in this case, New_UL_Deadline is greater than Current_UL_Deadline.

As the value of the coefficient K is larger, a difference between New_UL_Deadline and Current_UL_Deadline is larger. As the value of the coefficient K is smaller, a difference between New_UL_Deadline and Current_UL_Deadline is smaller.

Further, DL_Delay is calculated as DL_Delay=DL_FlowSize/DL_Throughput. UL_Delay is calculated as UL_Delay=UL_FlowSize/UL_Throughput. The allowable delay update unit 53 calculates New_UL_Deadline in Equation 1, or Equation 2, which is transformed from Equation 1, by using the uplink throughput (UL_Throughput), the downlink throughput (DL_Throughput), and the flow size managed in the communication requirement management unit 54.

The network interface 61 sends New_UL_Deadline calculated in the allowable delay update unit 53 to the eNB 22.

Although the calculation of New_UL_Deadline is mainly described above, the updated downlink allowable delay (New_DL_Deadline) is also calculated in the same manner as New_UL_Deadline. The following Equation 3 is used for the calculation of New_DL_Deadline.

$$\text{New\_DL\_Deadline} = \text{Current\_DL\_Deadline} + (\text{Target\_DL\_Delay} - \text{DL\_Delay}) \times K \quad \text{(Equation 3)}$$

New_D_Deadline: Updated downlink allowable delay
Current_DL_Deadline: Currently set downlink allowable delay
Target_DL_Delay: Target delay in the downlink path segment
DL_Delay: Delay occurring in the downlink path segment
K: Coefficient
Target_DL_Delay is calculated as Target_DL_Delay=E2E_Deadline−UL_Delay. Substituting Target_UL_Delay=E2E_Deadline-DL_Delay into Equation 3 yields the following Equation 4.

$$\text{New\_DL\_Deadline} = \text{Current\_DL\_Deadline} + \{E2E\_\text{Deadline} - (\text{DL\_Delay} + \text{UL\_Delay})\} \times K \quad \text{(Equation 4)}$$

The allowable delay update unit 53 calculates New_DL_Deadline in Equation 3, or Equation 4, which is transformed from Equation 3, by using the uplink throughput, the downlink throughput, and the flow size managed in the communication requirement management unit 54.

The network interface 61 sends New_DL_Deadline calculated in the allowable delay update unit 53 to the eNB 42.

Figure 4:
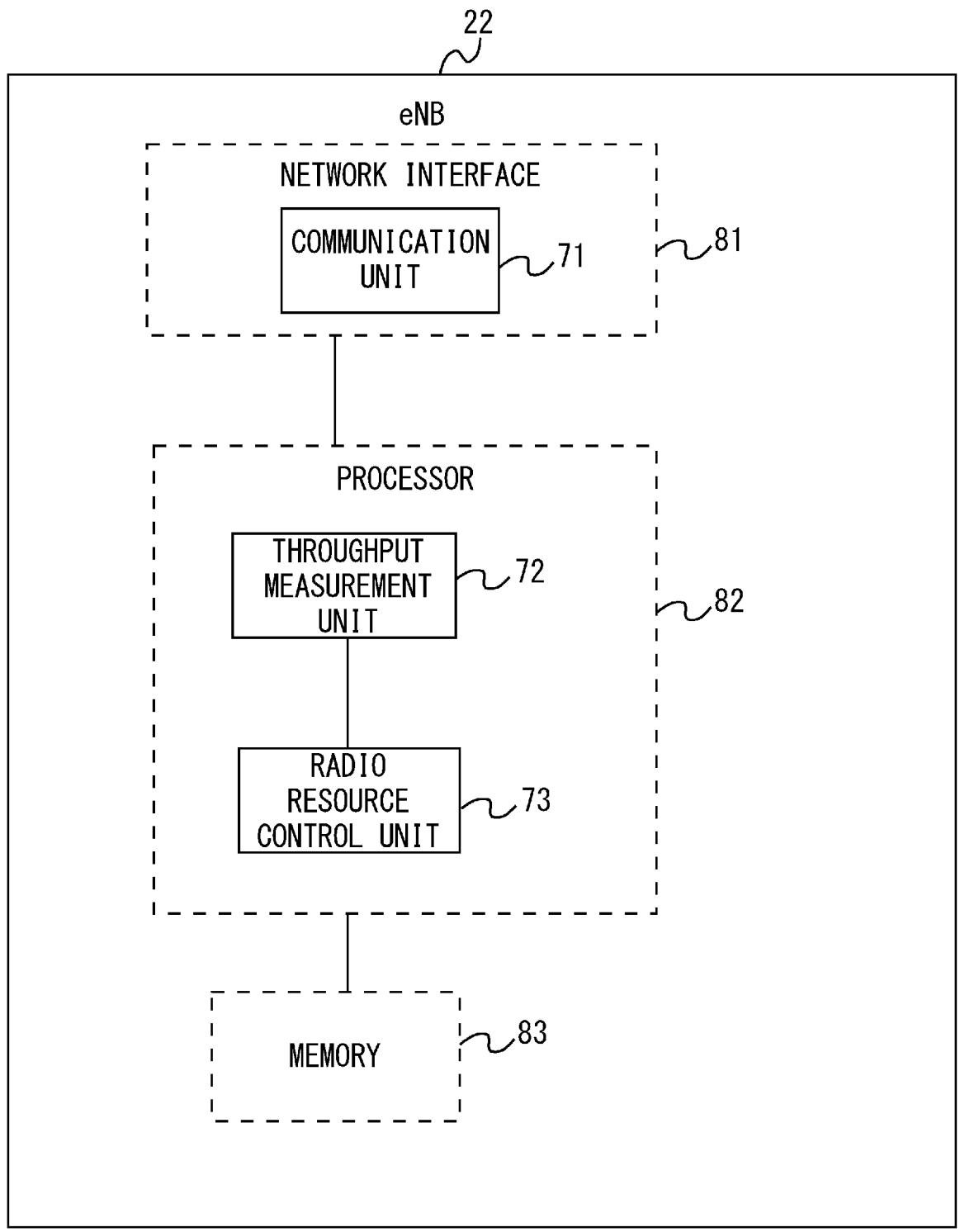
FIG. 4 is a block diagram of an eNB according to the second example embodiment.
Figure 5:
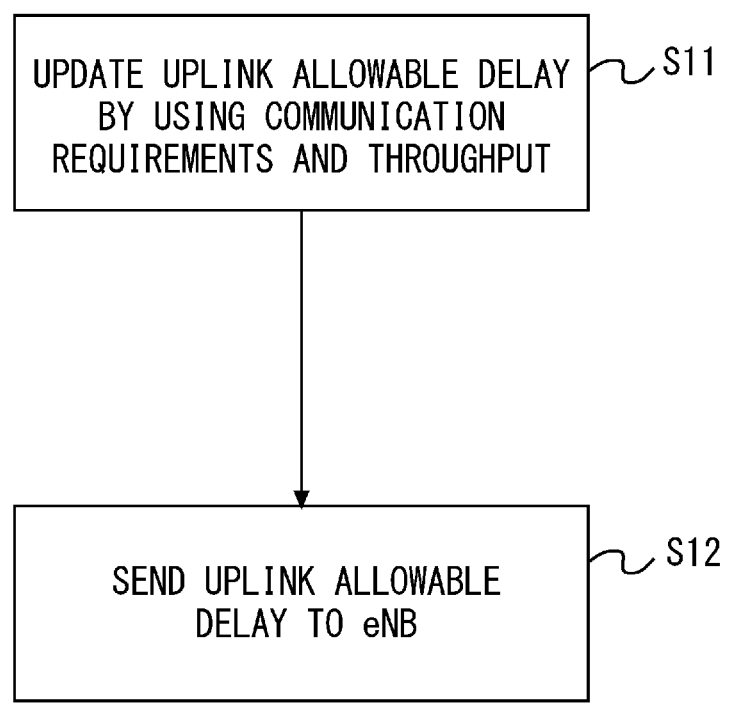
FIG. 5 is a view showing the flow of a process performed in the MEC server according to the second example embodiment.

A configuration example of the eNB 22 is described hereinafter with reference to FIG. 4. The eNB 42 has substantially the same configuration as the eNB 22, and the detailed description thereof is omitted. The eNB 22 includes a network interface 81, a processor 82, and a memory 83.

The network interface 81 may include a baseband processor that performs digital baseband signal processing. Alternatively, the network interface 81 may include a network interface card (NIC) compliant with IEEE 802.3 series. The network interface 81 includes a communication unit 71.

The processor 82 reads software (computer program) from the memory 83 and performs processing which is described hereinafter with reference to flowcharts and the like. The processor 82 may be a microprocessor, an MPU (Micro Processing Unit) or a CPU (Central Processing Unit), for example. The processor 82 may include a plurality of processors.

The memory 83 is a combination of a volatile memory and a nonvolatile memory. The memory 83 may include a storage that is placed apart from the processor 82. In this case, the processor 82 may access the memory 83 through an I/O interface, which is not shown. The memory 83 is used to store software or a group of software modules. The processor 82 reads and runs the software or the group of software modules from the memory 83.

The processor 82 is used to perform the functions or processing in a throughput measurement unit 72 and a radio resource control unit 73.

The throughput measurement unit 72 measures the throughput related to a flow sent from the UE 21. In other words, the throughput measurement unit 72 measures the throughput in the wireless section between the UE 21 and the eNB 22.

The communication unit 71 sends the throughput measured in the throughput measurement unit 72 to the MEC server 31. Further, the communication unit 71 receives New_UL_Deadline from the MEC server 31. The radio resource control unit 73 performs resource scheduling by using New_UL_Deadline received by the communication unit 71.

For example, the radio resource control unit 73 may compare the uplink allowable delays of flows sent by the UEs located in a cell formed by the eNB 22, and preferentially allocate radio resources to the UE that sends a flow where the uplink allowable delay is short. Alternatively, the radio resource control unit 73 may preferentially allocate radio resources to the UE that sends a flow where the period of time until the end of the uplink allowable delay is short. The radio resources may be resource blocks. The resource blocks are resources specified using a frequency and time. The resource blocks are radio resources defined in 3GPP.

The flow of a process of sending the uplink allowable delay that is performed in the MEC server 31 according to the second example embodiment is described hereinafter. A sending process of the downlink allowable delay is substantially the same as the sending process of the uplink allowable delay, and the detailed description thereof is omitted.

First, the allowable delay update unit 53 extracts the allowable delay and the flow size of the end-to-end flow as communication requirements from the communication requirement management unit 54. The allowable delay update unit 53 then calculates the delay occurring in the uplink path segment and the downlink path segment by using the throughput acquired from the throughput monitoring unit 52. The allowable delay update unit 53 further calculates the uplink allowable delay (New_UL_Deadline) (S11). The uplink allowable delay (New_UL_Deadline) is a value obtained by updating the current uplink allowable delay (Current_UL_Deadline).

Next, the communication unit 51 sends the uplink allowable delay (New_UL_Deadline) to the eNB 22 (S12). When the downlink allowable delay (New_DL_Deadline) is calculated, the communication unit 51 sends the downlink allowable delay (New_DL_Deadline) to the eNB 42.

Figure 6:
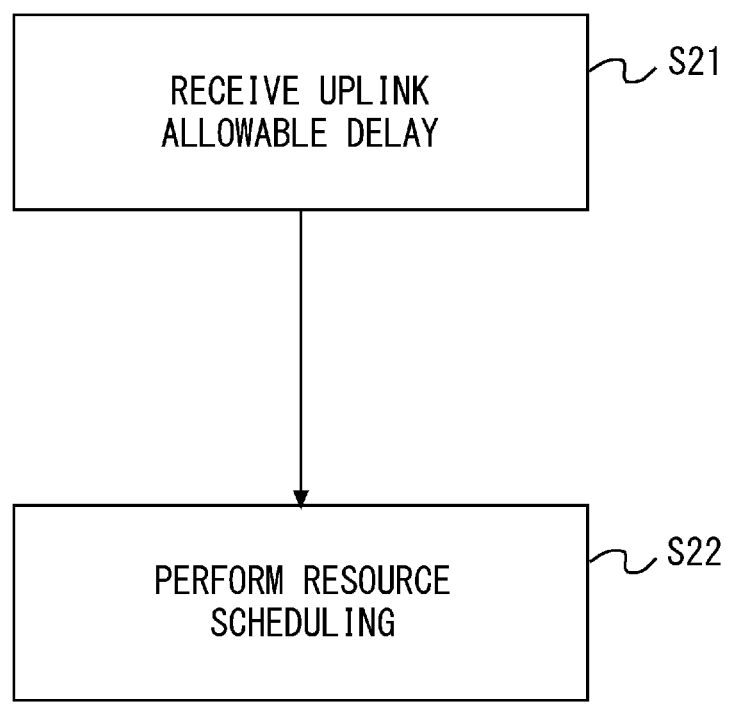
FIG. 6 is a view showing the flow of a process performed in the eNB according to the second example embodiment.

The flow of a process of resource scheduling that is performed in the eNB 22 according to the second example embodiment is described hereinafter with reference to FIG. 6. A process of resource scheduling performed in the eNB 42 is substantially the same as the process of resource scheduling performed in the eNB 22, and the detailed description thereof is omitted.

First, the communication unit 71 receives the uplink allowable delay (New_UL_Deadline) from the MEC server 31 (S21). Next, the radio resource control unit 73 performs resource scheduling based on the received uplink allowable delay (S22). For example, it is assumed that the uplink allowable delay of a flow related to the UE 21 is longer than the uplink allowable delay of a flow related to another UE. In such a case, the radio resource control unit 73 performs the allocation of radio resources to another UE preferentially to the UE 21. On the other hand, it is assumed that the uplink allowable delay of a flow related to the UE 21 is shorter than the uplink allowable delay of a flow related to another UE. In such a case, the radio resource control unit 73 performs the allocation of radio resources to the UE 21 preferentially to another UE.

As described above, the MEC server 31 according to the second example embodiment can change the uplink allowable delay or the downlink allowable delay according to variation in the delay occurring due to variation in the communication environment. The eNB 22 can perform resource scheduling by using the changed or updated uplink allowable delay.

When the delay occurring between the UE 21 and the UE 41 does not exceed the allowable delay associated with the end-to-end flow, the uplink allowable delay is updated to a value larger than the current value. In other words, when the communication environment of the wireless section is good and the delay occurring in the flow related to the UE 21 is small, the eNB 22 can reduce the priority of resource scheduling for the UE 21. As a result that the priority of resource scheduling for another UE different from the UE 21 becomes higher, the quality of the flow of another UE is improved.

When, on the other hand, the delay occurring between the UE 21 and the UE 41 exceeds the allowable delay associated with the end-to-end flow, the uplink allowable delay is updated to a value smaller than the current value. In other words, when the communication environment of the wireless section is degraded and the delay occurring in the flow related to the UE 21 becomes greater, the eNB 22 can increase the priority of resource scheduling for the UE 21. As a result that the priority of resource scheduling for the UE 21 becomes higher, the quality of the flow of the UE 21 is improved. Improving the quality of the flow may be improving the probability of satisfying a predetermined allowable delay, for example.

When the eNB 42 performs resource scheduling by using the updated downlink allowable delay also, the same effects as when the eNB 22 performs resource scheduling are obtained.

In the description of the second example embodiment, the allowable delay update unit 53 calculates the delay occurring in the uplink path segment and the downlink path segment by using the uplink throughput, the downlink throughput, and the flow size. However, the delay occurring in the uplink path segment and the downlink path segment may be measured in the eNB 22 or the eNB 42, for example. Alternatively, the delay occurring in the uplink path segment and the downlink path segment may be measured in the MEC server 31 or the application server 33. Thus, the delay occurring in the uplink path segment and the downlink path segment may be calculated indirectly by using the throughput or the like, or may be measured directly in the eNB or the like.

Further, in the description of the second example embodiment, the allowable delay update unit 53 updates the uplink allowable delay or the downlink allowable delay by using Equations 1 to 4. However, the allowable delay update unit 53 may update the uplink allowable delay or the downlink allowable delay as follows without using Equations 1 to 4. For example, the allowable delay update unit 53 may compare the allowable delay associated with the end-to-end flow and the delay occurring in the end-to-end flow. When the allowable delay associated with the end-to-end flow is greater than the delay occurring in the end-to-end flow, the allowable delay update unit 53 increases the currently set uplink allowable delay or downlink allowable delay. On the other hand, when the allowable delay associated with the end-to-end flow is smaller than the delay occurring in the end-to-end flow, the allowable delay update unit 53 reduces the currently set uplink allowable delay or downlink allowable delay. The rate of increase or decrease of the uplink allowable delay or the downlink allowable delay may be determined in advance. In this manner, the same effects as when using Equations 1 to 4 are obtained also with use of a comparison result between the allowable delay associated with the end-to-end flow and the delay occurring in the end-to-end flow.

Modified Example of Second Example Embodiment

A modified example related to the calculation procedure of the uplink allowable delay or the downlink allowable delay is described hereinbelow. The allowable delay update unit 53 may calculate the uplink allowable delay by using the following Equation 5, instead of Equations 1 to 4.

$$New\_UL\_Deadline = Current\_UL\_Deadline - (UL\_RequestedThroughput - UL\_Throughput) \times K \quad \text{(Equation 5)}$$

UL_RequestedThroughput: Target throughput in the uplink path segment

K: Constant

Further, UL_RequestedThroughput is calculated as UL_RequestedThroughput=UL_FlowSize/(E2E_Deadline−DL_Delay). DL_Delay is calculated as DL_Delay=DL_FlowSize/DL_Throughput.

It is assumed that (UL_RequestedThroughput−UL_Throughput) is in units of bit/second (bps), for example. It is also assumed that Current_UL_Deadline is in units of second (s). In such a case, K may be in units of s/bps in order to be consistent with Current_UL_Deadline and (UL_RequestedThroughput−UL_Throughput).

Further, in Equation 5, when UL_Throughput is larger than UL_RequestedThroughput, (UL_RequestedThroughput−UL_Throughput) has a negative value. Thus, New_UL_Deadline is greater than Current_UL_Deadline in this case. On the other hand, when UL_Throughput is smaller than UL_RequestedThroughput, (UL_RequestedThroughput−UL_Throughput) has a positive value. Thus, New_UL_Deadline is smaller than Current_UL_Deadline in this case.

The case where UL_Throughput is larger than UL_RequestedThroughput indicates that the communication environment is good, and the throughput is better than expected. The case where UL_Throughput is smaller than UL_RequestedThroughput indicates that the communication environment is degraded, and the throughput is worse than expected.

As described above, the allowable delay update unit 53 may calculate the uplink allowable delay or the downlink allowable delay by using Equation 5, instead of Equations 1 to 4.

Third Example Embodiment

Figure 7:
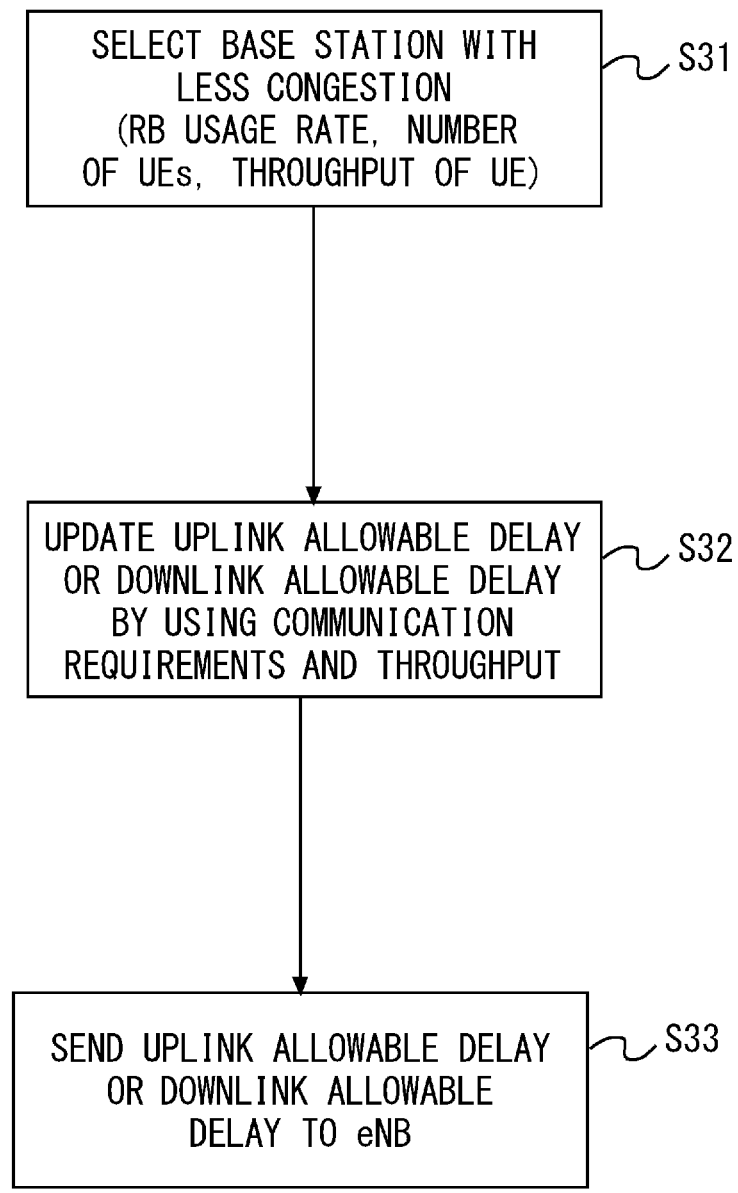
FIG. 7 is a view showing the flow of a process performed in an MEC server according to a third example embodiment.

The flow of a process of sending the uplink allowable delay that is performed in the MEC server 31 according to a third example embodiment is described hereinafter with reference to FIG. 7. FIG. 7 shows the flow of a selection process as to which of the uplink allowable delay and the downlink allowable delay is to be updated in the MEC server 31.

First, the allowable delay update unit 53 selects a base station with less congestion from the eNB 22 and the eNB 42 (S31). As the congestion, the usage rate of resource blocks, the number of UEs connecting to each eNB, and the throughput of the UE connecting to each eNB, for example, may be used. The usage rate of resource blocks is the proportion of radio resources already allocated to the UE by each eNB to allocable radio resources. The number of UEs connecting to each eNB may be the number of UEs to which radio resources are allocated by each eNB. Alternatively, the number of UEs connecting to each eNB may be the number of UEs located in a cell formed by the eNB and in the state of being capable of communicating with the eNB. The throughput of the UE may be the average throughput or the maximum throughput related to a plurality of UEs connecting to each eNB.

For example, the allowable delay update unit 53 may select the eNB with a low usage rate of resource blocks. Alternatively, the allowable delay update unit 53 may select the eNB with a small number of UEs connecting thereto. Alternatively, the allowable delay update unit 53 may select the eNB with a high throughput of the UE. When the throughput of the UE is high, there are likely to be a sufficient amount of radio resources to be allocated, and the congestion is considered to be low.

Further, resource blocks include MC (Mission Critical) resource blocks and BE (Best Effort) resource blocks. The MC resource blocks are resource blocks to be allocated to a flow with strict requirements for delay. The BE resource blocks are resource blocks to be allocated to a flow with less strict requirements for delay compared with the MC resource blocks. When there are insufficient MC resource blocks, the eNB allocates some or all of the BE resource blocks as the MC resource blocks. In the case of using the usage rate of resource blocks as the congestion, the allowable delay update unit 53 may compare the usage rate of the MC resource blocks only.

Then, the allowable delay update unit 53 updates the uplink allowable delay when the eNB 22 is selected in Step S31, updates the downlink allowable delay when the eNB 42 is selected (S32). When the uplink allowable delay is updated, the allowable delay update unit 53 sends the updated uplink allowable delay to the eNB 22 (S33). On the other hand, when the downlink allowable delay is updated, the allowable delay update unit 53 sends the updated downlink allowable delay to the eNB 42 (S33).

As described above, the MEC server 31 can select the eNB with less congestion and send the uplink allowable delay or the downlink allowable delay to the selected eNB. The eNB with less congestion is an eNB with less processing load. The processing load increases when the eNB changes resource scheduling by using the updated uplink allowable delay or downlink allowable delay. Specifically, the processing load is heavier when the eNB performs resource scheduling by using different allowable delays than when it performs resource scheduling by using the same uplink allowable delay or downlink allowable delay. As a result that the MEC server 31 selects the eNB with less congestion, the impact of an increase in processing load in the eNB on other functions, processing and so on in the eNB is reduced.

In the above-described example, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and can be modified as appropriate without departing from the spirit and scope of the present disclosure. Further, the present disclosure may be implemented by combining the above-described example embodiments with one another.

The whole or part of the example embodiments disclosed above can be described as, but not limited to, the following supplementary notes.

(Supplementary Note 1)
A management server comprising:
an update unit configured to update any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow; and
a communication unit configured to send the updated uplink allowable delay or the updated downlink allowable delay to a wireless access node configured to perform resource scheduling by using an uplink allowable delay or a downlink allowable delay.

(Supplementary Note 2)
The management server according to Supplementary Note 1, wherein the update unit updates any one of the uplink allowable delay and the downlink allowable delay to a smaller value than a currently set value when the delay is greater than the allowable delay, and updates any one of the uplink allowable delay and the downlink allowable delay to a larger value than a currently set value when the delay is smaller than the allowable delay.

(Supplementary Note 3)
The management server according to Supplementary Note 1 or 2, wherein the update unit adds a value obtained by subtracting the delay from the allowable delay to any one of the currently set uplink allowable delay and the currently set downlink allowable delay.

(Supplementary Note 4)
The management server according to Supplementary Note 3, wherein the update unit adds a value obtained by subtracting the delay from the allowable delay and a first coefficient to any one of the currently set uplink allowable delay and the currently set downlink allowable delay.

(Supplementary Note 5)
The management server according to any one of Supplementary Notes 1 to 4, wherein the update unit calculates the delay by using a flow size of the end-to-end flow and a throughput of the end-to-end flow.

(Supplementary Note 6)
The management server according to any one of Supplementary Notes 1 to 5, wherein the update unit updates the uplink allowable delay or the downlink allowable delay used in a wireless access node with less congestion selected from a first wireless access node configured to perform resource scheduling by using the uplink allowable delay and a second wireless access node configured to perform resource scheduling by using the downlink allowable delay.

(Supplementary Note 7)
The management server according to Supplementary Note 6, wherein the congestion is determined based on at least one of a usage rate of resource blocks allocated to the communication terminal, the number of communication terminals connecting to the wireless access node, and a throughput of the communication terminal connecting to the wireless access node.

(Supplementary Note 8)
A wireless access node comprising:
a communication unit configured to acquire any one of an uplink allowable delay associated with an uplink flow sent from a source communication terminal to an application server and a downlink allowable delay associated with a downlink flow sent from the application server to a destination communication terminal updated by using a delay of an end-to-end flow sent from the source communication terminal to the destination communication terminal through the application server and an allowable delay associated with the end-to-end flow; and a control unit configured to perform resource scheduling related to any one of the source communication terminal and the destination communication terminal by using any one of the acquired uplink allowable delay and the acquired downlink allowable delay.

(Supplementary Note 9)

The wireless access node according to Supplementary Note 8, wherein the control unit performs resource scheduling related to a plurality of communication terminals, and preferentially allocates resources to a communication terminal where any one of the uplink allowable delay and the downlink allowable delay is shorter compared with another communication terminal.

(Supplementary Note 10)

A communication system comprising:

a management server configured to update any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow, and send the updated uplink allowable delay or the updated downlink allowable delay; and a wireless access node configured to perform resource scheduling by using the updated uplink allowable delay or the updated downlink allowable delay.

(Supplementary Note 11)

The communication system according to Supplementary Note 10, wherein the management server updates any one of the uplink allowable delay and the downlink allowable delay to a smaller value than a currently set value when the delay is greater than the allowable delay, and updates any one of the uplink allowable delay and the downlink allowable delay to a larger value than a currently set value when the delay is smaller than the allowable delay.

(Supplementary Note 12)

A communication method comprising: updating any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow; and sending the updated uplink allowable delay or the updated downlink allowable delay to a wireless access node configured to perform resource scheduling by using an uplink allowable delay or a downlink allowable delay.

(Supplementary Note 13)

A resource management method comprising:

acquiring any one of an uplink allowable delay associated with an uplink flow sent from a source communication terminal to an application server and a downlink allowable delay associated with a downlink flow sent from the application server to a destination communication terminal updated by using a delay of an end-to-end flow sent from the source communication terminal to the destination communication terminal through the application server and an allowable delay associated with the end-to-end flow; and performing resource scheduling related to any one of the source communication terminal and the destination communication terminal by using any one of the acquired uplink allowable delay and the acquired downlink allowable delay.

(Supplementary Note 14)

A program causing a computer to perform:

updating any one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow; and sending the updated uplink allowable delay or the updated downlink allowable delay to a wireless access node configured to perform resource scheduling by using an uplink allowable delay or a downlink allowable delay.

(Supplementary Note 15)

A program causing a computer to perform:

acquiring any one of an uplink allowable delay associated with an uplink flow sent from a source communication terminal to an application server and a downlink allowable delay associated with a downlink flow sent from the application server to a destination communication terminal updated by using a delay of an end-to-end flow sent from the source communication terminal to the destination communication terminal through the application server and an allowable delay associated with the end-to-end flow; and performing resource scheduling related to any one of the source communication terminal and the destination communication terminal by using any one of the acquired uplink allowable delay and the acquired downlink allowable delay.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

REFERENCE SIGNS LIST

10 MANAGEMENT SERVER
11 UPDATE UNIT
12 COMMUNICATION UNIT
21 UE
22 ENB
31 MEC SERVER
32 GATEWAY DEVICE
33 APPLICATION SERVER
41 UE
42 ENB
51 COMMUNICATION UNIT
52 THROUGHPUT MONITORING UNIT
53 ALLOWABLE DELAY UPDATE UNIT
54 COMMUNICATION REQUIREMENT MANAGEMENT UNIT
61 NETWORK INTERFACE
62 PROCESSOR
63 MEMORY
71 COMMUNICATION UNIT
72 THROUGHPUT MEASUREMENT UNIT
73 RADIO RESOURCE CONTROL UNIT

81 NETWORK INTERFACE
82 PROCESSOR
83 MEMORY

The invention claimed is:

1. A management server comprising:
at least one memory storing instructions, and
at least one processor configured to execute the instructions to:
update one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow;
send the updated uplink allowable delay or the updated downlink allowable delay to a wireless access node configured to perform resource scheduling by using an uplink allowable delay or a downlink allowable delay; and
update one of the uplink allowable delay and the downlink allowable delay to a smaller value than a currently set value when the delay is greater than the allowable delay, and update one of the uplink allowable delay and the downlink allowable delay to a larger value than a currently set value when the delay is smaller than the allowable delay.

2. The management server according to claim 1, wherein the at least one processor is further configured to execute the instructions to add a value obtained by subtracting the delay from the allowable delay to one of the currently set uplink allowable delay and the currently set downlink allowable delay.

3. The management server according to claim 2, wherein the at least one processor is further configured to execute the instructions to add a product of a value obtained by subtracting the delay from the allowable delay and a first coefficient to one of the currently set uplink allowable delay and the currently set downlink allowable delay.

4. The management server according to claim 1, wherein the at least one processor is further configured to execute the instructions to calculate the delay by using a flow size of the end-to-end flow and a throughput of the end-to-end flow.

5. The management server according to claim 1, wherein the at least one processor is further configured to execute the instructions to update the uplink allowable delay or the downlink allowable delay used in a wireless access node with less congestion selected from a first wireless access node configured to perform resource scheduling by using the uplink allowable delay and a second wireless access node configured to perform resource scheduling by using the downlink allowable delay.

6. The management server according to claim 5, wherein the congestion is determined based on at least one of a usage rate of resource blocks allocated to the communication terminal, the number of communication terminals connected to the wireless access node, and a throughput of the communication terminal connected to the wireless access node.

7. A wireless access node comprising:
at least one memory storing instructions, and
at least one processor configured to execute the instructions to:
acquire one of an uplink allowable delay associated with an uplink flow sent from a source communication terminal to an application server and a downlink allowable delay associated with a downlink flow sent from the application server to a destination communication terminal updated by using a delay of an end-to-end flow sent from the source communication terminal to the destination communication terminal through the application server and an allowable delay associated with the end-to-end flow; and
perform resource scheduling related to one of the source communication terminal and the destination communication terminal by using one of the acquired uplink allowable delay and the acquired downlink allowable delay,
wherein one of the uplink allowable delay and the downlink allowable delay is updated to a smaller value than a currently set value when the delay is greater than the allowable delay, and one of the uplink allowable delay and the downlink allowable delay is updated to a larger value than a currently set value when the delay is smaller than the allowable delay.

8. The wireless access node according to claim 7, wherein the at least one processor is further configured to execute the instructions to perform resource scheduling related to a plurality of communication terminals, and preferentially allocate resources to a communication terminal where one of the uplink allowable delay and the downlink allowable delay is shorter compared with that of another communication terminal.

9. A communication method comprising:
updating one of an uplink allowable delay associated with an uplink flow sent from a source communication terminal to an application server and a downlink allowable delay associated with a downlink flow sent from the application server to a destination communication terminal by using a delay of an end-to-end flow sent from the source communication terminal to the destination communication terminal through the application server and an allowable delay associated with the end-to-end flow;
sending the updated uplink allowable delay or the updated downlink allowable delay to a wireless access node configured to perform resource scheduling by using an uplink allowable delay or a downlink allowable delay; and
updating one of the uplink allowable delay and the downlink allowable delay to a smaller value than a currently set value when the delay is greater than the allowable delay, and updating one of the uplink allowable delay and the downlink allowable delay to a larger value than a currently set value when the delay is smaller than the allowable delay.

* * * * *